United States Patent
Song et al.

(10) Patent No.: US 10,060,544 B2
(45) Date of Patent: Aug. 28, 2018

(54) NOISE ATTENUATED FILL LIMIT VENT VALVE

(71) Applicant: Ford Global Technologies, LLC, Dearborn, MI (US)

(72) Inventors: Xiankai Song, Farmington Hills, MI (US); Zhe Li, Dearborn, MI (US); Dennis Michael Harrigan, Sr., Monroe, MI (US); Rodolfo Palma, Sr., Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/056,002

(22) Filed: Feb. 29, 2016

(65) Prior Publication Data

US 2017/0248243 A1    Aug. 31, 2017

(51) Int. Cl.
| | |
|---|---|
| *F16K 21/18* | (2006.01) |
| *F16K 24/04* | (2006.01) |
| *F16K 31/22* | (2006.01) |
| *F16K 33/00* | (2006.01) |
| *F16K 31/18* | (2006.01) |
| *B60K 15/035* | (2006.01) |
| *F16F 1/02* | (2006.01) |

(52) U.S. Cl.
CPC ...... *F16K 24/044* (2013.01); *B60K 15/03519* (2013.01); *F16K 21/18* (2013.01); *F16K 31/18* (2013.01); *F16K 31/22* (2013.01); *F16K 33/00* (2013.01); *F16F 1/025* (2013.01)

(58) Field of Classification Search
CPC ...... F16K 21/18; F16K 24/042; F16K 24/044; F16K 31/20; F16K 31/22; F16K 33/00; F16K 31/18; Y10T 137/2965; Y10T 137/2968; Y10T 137/3099; Y10T 137/6004; Y10T 137/7423; Y10T 137/7426; Y10T 137/7436; F16F 1/025; F16F 1/027; F16F 1/123; F16F 1/125; F16F 1/127; F16F 1/10; F16F 2230/0041; F16F 2230/007; F16F 2234/00; F16F 2236/06; F16F 2238/00; F16F 2238/026; F16F 2238/028; F16F 7/09; F16F 1/04; F16F 1/122
See application file for complete search history.

(56) References Cited

U.S. PATENT DOCUMENTS

| | | | |
|---|---|---|---|
| 1,349,090 A | | 8/1920 | Ohrt |
| 2,344,304 A | * | 3/1944 | Hooper ............ F16K 24/042 137/388 |
| 2,503,149 A | * | 4/1950 | Bonnemort ........... F16F 1/10 267/155 |

(Continued)

FOREIGN PATENT DOCUMENTS

| | | | |
|---|---|---|---|
| DE | 9301334 U1 * | 4/1993 | ........ F16C 25/083 |
| DE | 102007014849 A1 | 10/2008 | |

(Continued)

*Primary Examiner* — Reinaldo Sanchez-Medina
*Assistant Examiner* — Hailey K Do
(74) *Attorney, Agent, or Firm* — Julia Voutyras; McCoy Russell LLP (57) ABSTRACT

Systems are provided for a noise attenuation device for a valve. In one example, a system may include a single noise attenuation device located below a base of a fill limit vent valve.

19 Claims, 5 Drawing Sheets

(56) References Cited

U.S. PATENT DOCUMENTS

| | | | | |
|---|---|---|---|---|
| 3,586,032 | A | * | 6/1971 | Weinstein ............. F16K 24/048 |
| | | | | 137/202 |
| 4,171,712 | A | | 10/1979 | DeForrest |
| 4,679,581 | A | | 7/1987 | Mears |
| 5,062,441 | A | * | 11/1991 | Glukhov ................ B64D 11/02 |
| | | | | 137/192 |
| 5,832,950 | A | * | 11/1998 | Shimada .......... B60K 15/03519 |
| | | | | 137/202 |
| 6,341,767 | B1 | * | 1/2002 | Seale ...................... F01L 1/462 |
| | | | | 267/169 |
| 6,405,766 | B1 | | 6/2002 | Benjey |
| 6,431,199 | B1 | | 8/2002 | Kolb et al. |
| 6,578,597 | B2 | * | 6/2003 | Groom ............. B60K 15/03519 |
| | | | | 137/202 |
| 6,688,330 | B1 | | 2/2004 | Ehrman et al. |
| 6,866,058 | B1 | * | 3/2005 | Brock ............. B60K 15/03519 |
| | | | | 137/202 |
| 7,146,729 | B2 | | 12/2006 | Spink et al. |
| 7,247,007 | B2 | * | 7/2007 | Roke .................... F04B 35/045 |
| | | | | 267/174 |
| 7,617,838 | B2 | | 11/2009 | Katzman et al. |
| 8,100,153 | B2 | * | 1/2012 | Hirata .................... F16K 31/22 |
| | | | | 137/202 |
| 8,869,818 | B2 | | 10/2014 | Ko et al. |
| 2010/0051114 | A1 | | 3/2010 | Yamada et al. |

FOREIGN PATENT DOCUMENTS

| | | | | |
|---|---|---|---|---|
| EP | 2228560 | A2 | * | 9/2010 ............. F16F 1/121 |
| GB | 1001384 | A | * | 8/1965 ............. F01C 19/10 |
| JP | WO 0184027 | A1 | * | 11/2001 ........... F16K 24/044 |

* cited by examiner

NOISE ATTENUATED FILL LIMIT VENT VALVE

FIELD

The present description relates generally to a noise attenuation device for a vent valve.

BACKGROUND/SUMMARY

Modern vehicles utilize fuel management systems that control fuel vapor venting from a vehicle fuel tank to limit fuel filling and that control fuel tank ventilation to prevent overpressure and vacuum conditions in the fuel tank. Fuel filling is controlled to allow a headspace of fuel vapor to exist above a fuel level in the fuel tank. This allows vapors to vent to a fuel vapor recovery device during thermal expansion, on-grade parking, and other similar conditions.

Exemplary embodiments of a fill limit vent valve (FLVV) may include a float device responsive to a buoyant force of fuel in the fuel tank. Thus when a fuel filled level is reached, the float may block an upper side of the FLVV and prevent fuel from entering the fuel tank. This enables the fuel tank to maintain a desired headspace of fuel vapor while signaling to a fuel pump operator that the fuel tank has reached a full condition. Furthermore, fuel vapor may not vent to a purge system of a fuel assembly when the float blocks the upper side of the FLVV.

Fuel levels in the fuel tank may decrease during vehicle operation and cause actuation of the float away from the upper side of the FLVV. The float may contact a lower side of the FLVV during fuel depletion and produce an undesired noise capable of penetrating a body of the fuel tank, audible to an operator or passengers of the vehicle.

Attempts to address noise permeation from actuation of the float in the FLVV include coupling a damping device to an interior portion of the FLVV. One example approach is shown by Ko et al. in U.S. Pat. No. 8,869,818. Therein, a valve body of the FLVV is prevented from hitting a lower body of the FLVV via a damping device located between the valve body and a lower end. The damping device includes elastic arms capable of absorbing the kinetic motion due to displacement of the valve body in response to buoyant forces.

However, the inventors herein have recognized potential issues with such systems. As one example, a profile of the FLVV is elongated to accommodate insertion of the damping device between the valve body and the lower end of the FLVV. Furthermore, the damping device may degrade, resulting in loose pieces of the damping device being located in an interior portion of the FLVV between the valve body and the lower body. This may cause the valve body to be fixed in a single position, which may prevent fuel from entering the fuel tank. As another example, the manufacturing and installation of the damping device may be difficult due to disassembling the FLVV in order to gain access to the damping device.

In one example, the issues described above may be addressed by a fluid tank comprising float axially displaceable in a valve, where the float sealingly engages an outlet of the valve in an upper position, and where the float contacts a lower portion of the valve in a lower position, and where a protuberance of the float extends through an opening of the lower portion and engages with a noise attenuation device outside an annular passage of the valve. In this way, a noise generated by the float contacting the base of the FLVV is decreased As one example, the noise attenuation device is adjustable and may be easily added onto current FLVV's by manipulating a shape of the flexible wire to correspond with the FLVV shape. The noise attenuation device may absorb a portion of kinetic energy from the float as it moves to the lower position, and then return a portion of the portion of kinetic energy absorbed back to the float, thereby pushing it slightly toward an upper position. In this way, the noise attenuation device comprises a soft landing platform for the float while also providing a mechanism to aid in lifting the float.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5B are shown approximately to scale, although other relative dimensions may be used.

DETAILED DESCRIPTION

Figure 1:
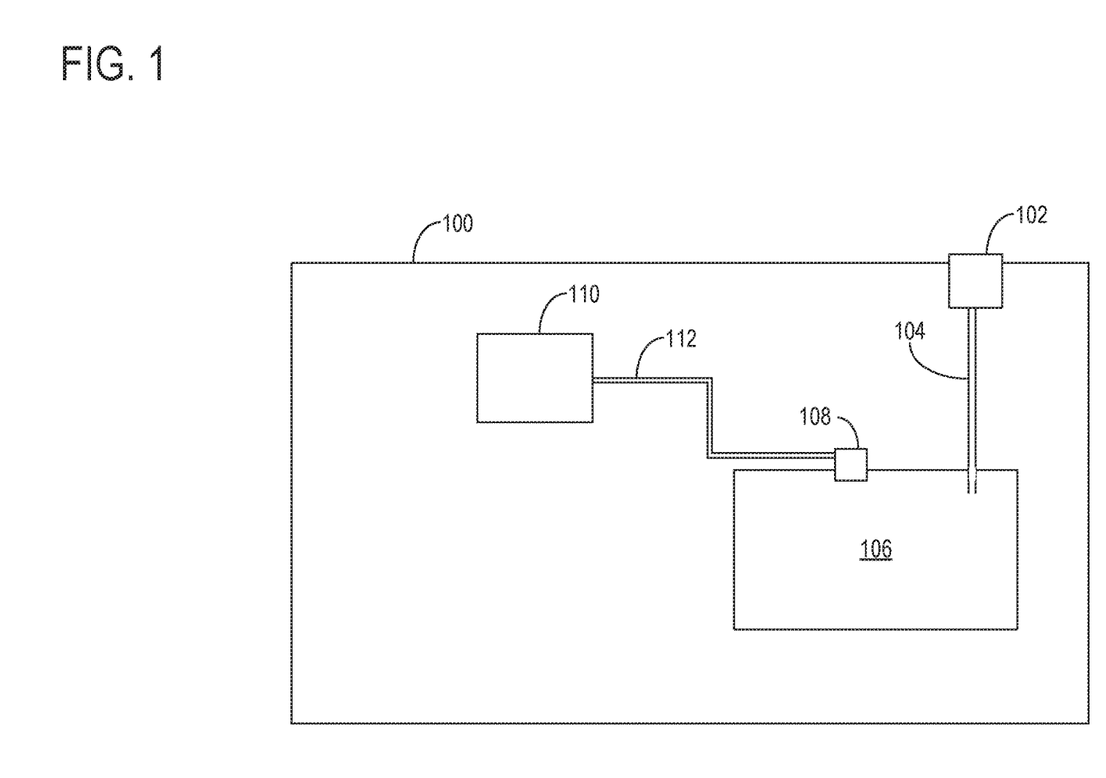
FIG. 1 depicts a vehicle with a fuel system.
Figure 2:
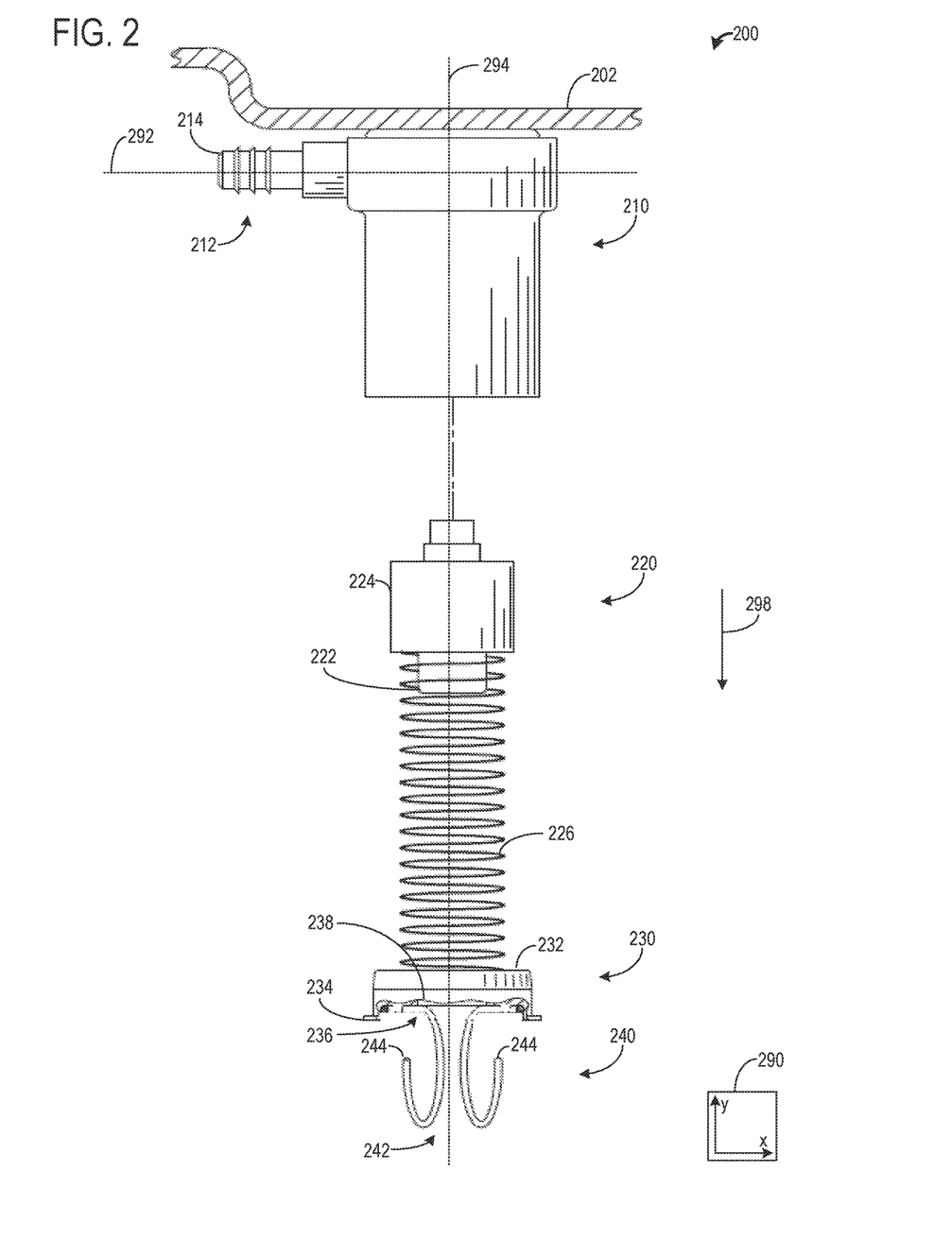
FIG. 2 depicts a disassembled view of a fill limit vent valve with a noise attenuation device.
Figure 3:
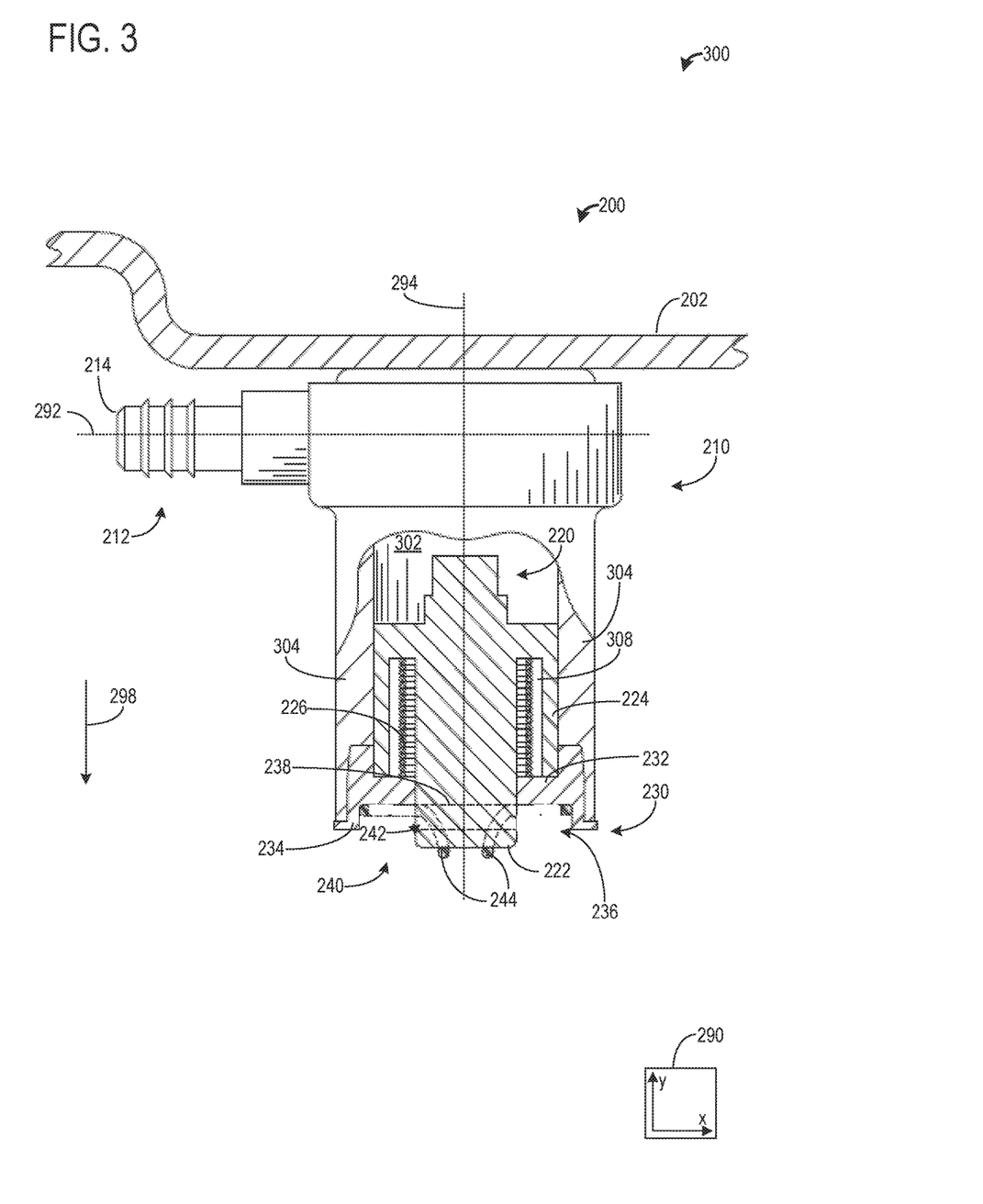
FIG. 3 depicts a cross-sectional view of the fill limit vent valve with a float in a lower position.
Figure 4:
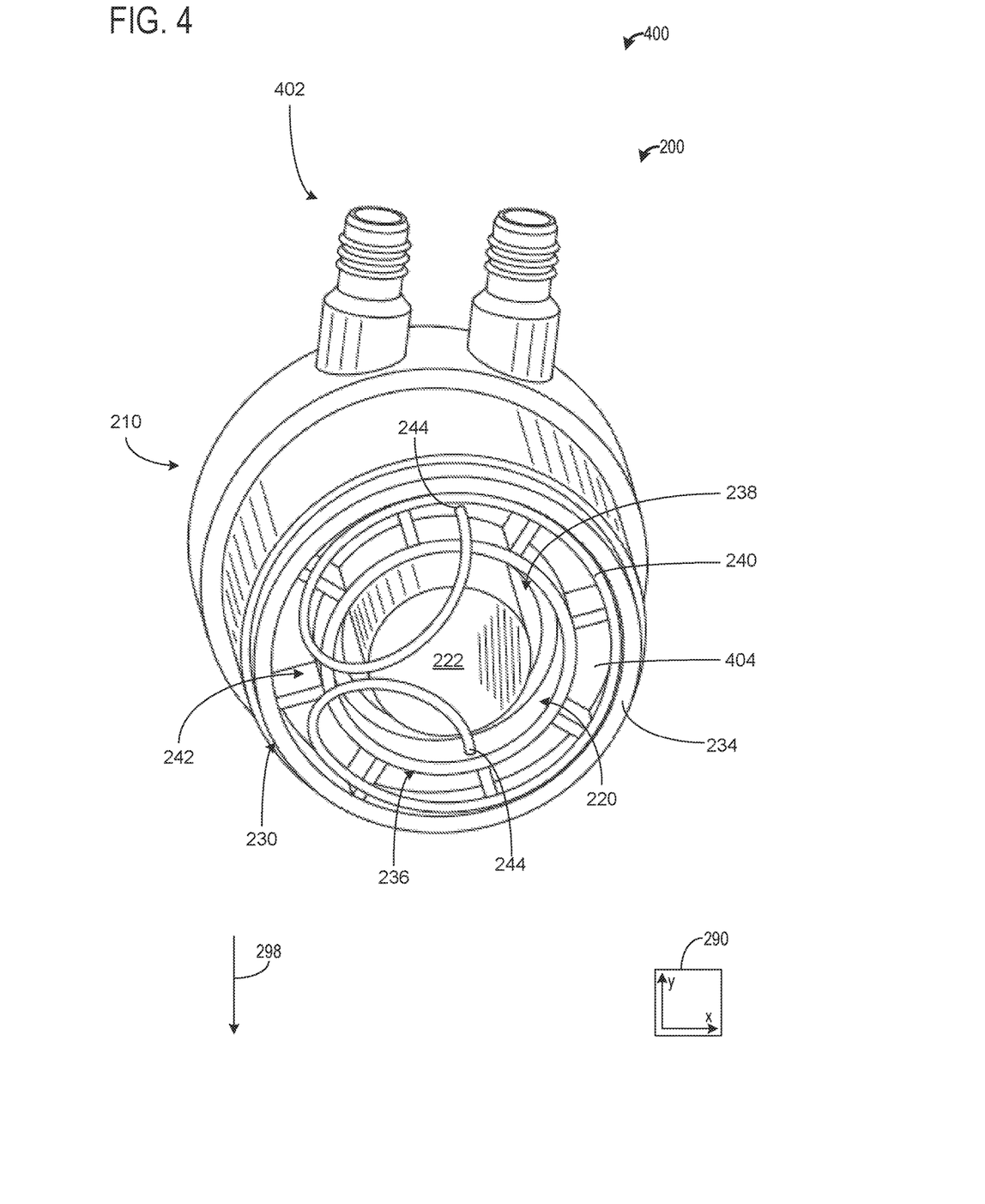
FIG. 4 depicts a bottom up view of the fill limit vent valve and a shape of the noise attenuation device.
Figure 5A:
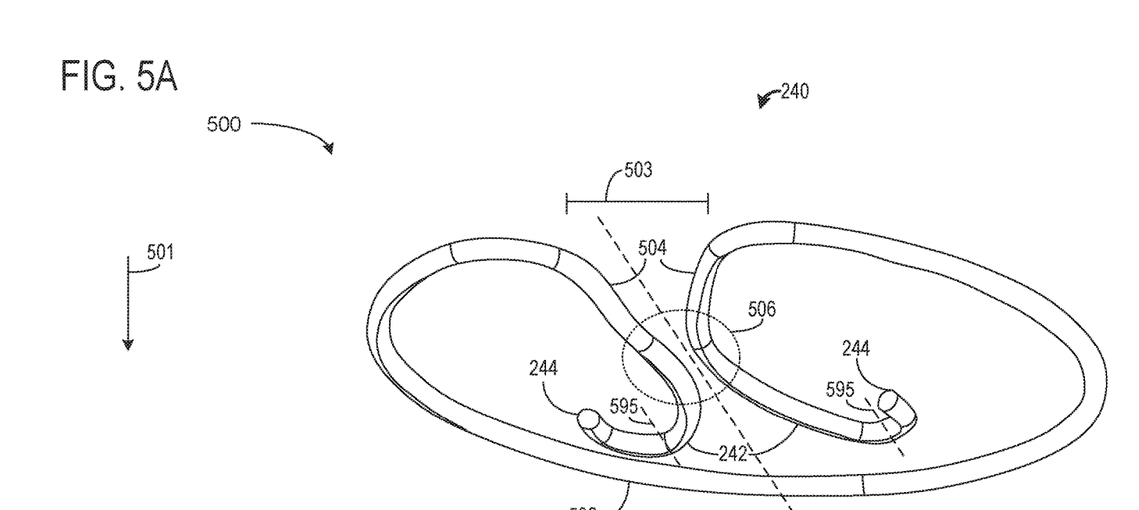
FIG. 5A depicts an isometric view of the noise attenuation device.
Figure 5B:
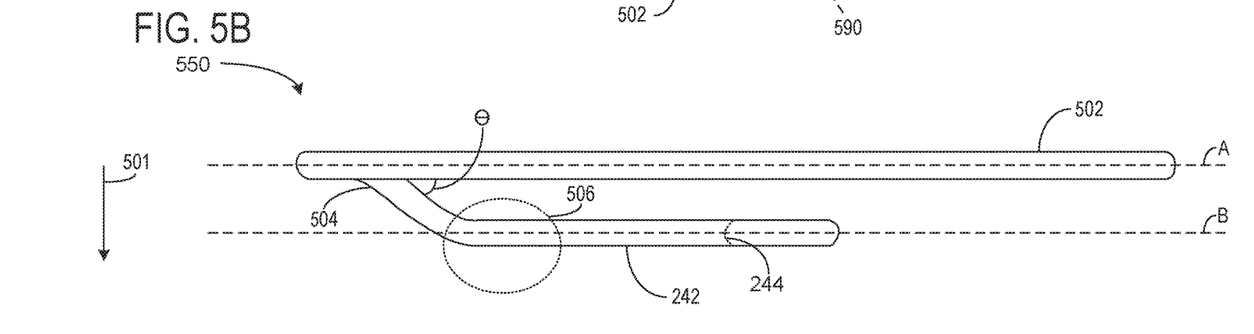
FIG. 5B shows a side-on view of the noise attenuation device.

The following description relates to systems for mitigating noise generated from displacement of a float in a fill limit vent valve (FLVV). The FLVV may be fluidly coupled to a fuel tank configured to receive fuel from a refueling port and corresponding channel, as shown in FIG. 1. The refueling port and the channel may be used to admit fuel to a fuel tank in response to an operator inserting a fuel nozzle into the refueling port. The FLVV includes a plurality of components for regulating the expulsion of vapors from the fuel tank, as shown in FIG. 2. A float may be displaced in response to buoyant forces of the fuel tank, as described above. A noise attenuation device catches the float as it moves to a lower position, reducing a kinetic energy of the float such that less kinetic energy is converted into sound energy when the float contacts a lower portion of the FLVV, as shown in FIG. 3. The noise attenuation device is below the lower portion outside of an interior of the FLVV, as shown in FIG. 4. The noise attenuation device is a contiguous, flexible device. A magnified depiction of the noise attenuation device is shown in FIGS. 5A and 5B.

FIGS. 2-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

FIG. 1 shows a vehicle 100 comprising a refueling port 102 configured to receive a fuel refilling nozzle from a fuel pump of a fuel station. A fuel tank 106 receives fuel from the refueling port 102 via a channel 104 extending into the fuel tank. A plurality of devices may be coupled to the fuel tank 106 for controlling a fill volume for providing the fuel tank with a desired amount of vapor space. One example device may include a fill limit vent valve (FLVV) 108. As an example, the FLVV may be in open position (e.g., lower position) in response to an amount of fuel in the fuel tank 106 being less than the fill volume. In other words, the open position may be based on a fuel level of the fuel tank being less than a threshold level (a full level). When the FLVV 108 is in the open position (fuel tank not full), the FLVV allows an interior volume of the fuel tank 106 to be fluidly coupled to a purge system 110 where fuel vapors are vacated from the fuel tank 106 to allow a greater volume of liquid fuel to fill the tank. As an example, the FLVV 108 may remain in the open position during a refueling event until the fuel level of the fuel tank is substantially equal to the threshold level. The FLVV 108 may move to a substantially closed position in response to the fuel level being substantially equal to the threshold level. When the FLVV 108 in a closed position (fuel tank full), the FLVV prevents fluid communication between the fuel tank 106 and a vent passage 112 of the purge system 110. In this way, fuel vapors in the fuel tank may not flow into the purge system 110 via the vent passage 112 when the FLVV 108 is closed. This may allow the fuel tank 106 to maintain a desired vapor head space while a separate actuator (e.g., a pressure check valve) allows substantially no additional fuel to flow from the channel 104 to the fuel tank 106, maintaining a liquid fuel volume in the fuel tank.

The channel 104 and the vent passage 112 may be channels, tubes, passages, etc. capable of guiding liquids or gases, respectively. The vent passage 112 may be coupled to one or more valve side ports of the FLVV as will be described below.

The FLVV 108 may be assembled through an access opening formed in an upper wall of the fuel tank 106. The FLVV 108 may comprise a float extending interiorly of the fuel tank 106 and a fuel admittance/fuel vapor expulsion portion of the FLVV extending exteriorly of the tank. In some examples, the FLVV 108 may be completely housed within the fuel tank 106 and thus, the fuel tank 106 may comprise openings for receiving the vent passage 112 and/or other passages configured for receiving fuel vapor. An outer body of the FLVV 108 may be fixed to and hermetically sealed with a surface of the tank 106. The FLVV 108 and the fuel tank 106 may be fluidly separated for a float in a first position (e.g., the closed position) and fluidly coupled for a float in a second position (e.g., the open position), as will be described below. The float of the FLVV 108 is actuated based on a buoyant force in the fuel tank in one example. Therefore, the FLVV 108 may not be coupled to any electrical and or mechanical actuators. As an example, the FLVV 108 may further comprise mechanisms for substantially preventing a fuel vapor leak from the fuel tank 106 for an inverted vehicle (e.g., wheels no longer touching the ground).

FIG. 2 shows an isometric view of a disassembled FLVV 200. The FLVV 200 may be used similarly to the FLVV 108 in the embodiment of FIG. 1. The FLVV comprises three components namely, an upper portion 210, a float 220, and a lower portion 230 (e.g., base). In the disassembled view, the upper portion 210 and the lower portion 230 are disconnected and the float 220 is outside the upper portion 210. The float 220 is a single solid piece and may be actuated based on a buoyant force of a fuel tank. The FLVV 200 is coupled to an upper wall 202 of the fuel tank.

An axes system 290 is shown comprising of two axes, an x-axis axis (e.g., horizontal axis) parallel to a horizontal direction and a y-axis (e.g., vertical axis) parallel to a vertical direction relative to a direction of gravity (arrow 298). A central axis 292 of a valve side port 212 of the upper portion 210 is depicted by a dashed line. A central axis 294 (also depicted by a dashed line) of the FLVV 200 is perpendicular to the central axis 292. In some embodiments, the valve side port 212 may be inclined to the central axis 294 by an angle greater than 90° and less than 180°. Alternatively, the valve side port 212 may be declined to the central axis 294 by an angle less than 90° and greater than 0°.

The upper portion 210 is in face-sharing contact with an interior surface of the upper wall 202. Specifically, for a vehicle in an upright position on a flat surface, the upper portion may be physically coupled via one or more of adhesives, a weld, mold, etc. to the upper wall 202, where the upper wall is an uppermost wall of the fuel tank. In this way, the FLVV 200 may be above (higher than) liquid fuel in the fuel tank, but may be in contact with fuel vapors in the fuel tank.

The upper portion 210 is tubular (cylindrical) with an annular passage located therein for permitting the flow of fuel vapor. The float 220 may control an opening and closing of the annular passage based on an axial (vertical) movement of the float responsive to a buoyant force of the fuel tank. Thus, the float 220 is vertically displaceable within the upper portion 210, between an upper position in which it sealingly engages an outlet port in fluid communication with the nozzle 212, and a lower portion in which it is disengaged from the outlet, but does not interfere with inlets formed on the lower portion 230. In one example, the inlets may be a plurality of perforations on the lower portion 230 fluidly coupling the annular passage to the fuel tank.

The lower portion 230 comprises a locking mechanism on an annular seating surface 232 for engagement with the upper portion 210. The locking mechanism may include clamps, latches, a twist-lock, or other suitable locking means. Annular seating surface 232 of the lower portion 230 has a circumference correspondingly smaller than a circumference of the upper portion 210, allowing the annular seating surface to engage with the float 220 in the lower position within the annular passage. The lower portion 230 may further comprise a spring 226 for contributing to a closing force of the float 220, urging the float to the upper position in response to a buoyant force of a fuel tank exceeding a threshold pressure, where the threshold pressure is based on a pressure capable of moving the float. Thus, the spring 226 may be biased. The spring 226 is a helical spring in one example. An outer wall 224 of the float is concentric with the protuberance 222 with an annular indentation located therebetween, extending into the float. The spring 226 may contact the float 220 via the annular indentation. A height of the annular indentation is substantially equal to a height of the spring 226 in a compressed form. Substantially equal may be defined as the height of the annular indentation deviating from a height of the compressed spring 226 by a tolerance of 1-5%. In one example, the spring 226 is physically coupled to one or more of the float 220 and the lower portion 230.

The spring 226 may be configured to operate differently based on various positions of a vehicle. As a first example including a vehicle in an upright position, the spring assists the float 220 of the FLVV 200 to the upper position in conjunction with a buoyant force from the fuel tank acting upon the float in an upward direction against gravity (arrow 298). As a second example including a vehicle turned 90° to the upright position (e.g., for a vehicle turned on its side), the spring forces the float to its upper position (e.g., shut-off/ closed position) to contain fuel (liquid and gaseous) in the fuel tank. The spring 226 may urge the float 220 to the closed position based on one or more of a force of the float acting upon the spring 226 for a vehicle lying on its side being less than a force of the float for a vehicle in the upright position and a buoyant force of the fuel tank increasing due increased turbulence created during rotation of the vehicle. As a third example including a vehicle in a position inverted (e.g., 180° to) to the upright position (e.g., vehicle roll), the spring 226 urges the float 220 to the closed position to contain fuel (liquid and gaseous) in the fuel tank. The spring 226 may move the float 220 to the closed position with assistance from one or more of a buoyant force in the tank and a force of gravity.

The lower portion 230 further comprises a bore 238 centered along the central axis 294 capable of receiving a protuberance 222 of the float when the float 220 actuates toward the lower position. The bore 238 may comprise a diameter smaller than a diameter of an annular opening located below the bore. The bore and annular opening are concentric. A noise attenuation device 240 may be located in the annular opening 236 below the annular seating surface 232 of the lower portion 230, where the noise attenuation device is pressed against walls of the annular opening 236. Thus, a circumference of the noise attenuation device 240 may be correspondingly smaller than a circumference of the annular opening 236. The noise attenuation device 240 may be a single contiguous piece comprising of a malleable material where the material may be copper, nickel, aluminum, chromoly, titanium, alloys, and/or other suitably stiff materials. In one example, the noise attenuation device 240 may be a flexible wire (e.g., wire loop spring) shaped to correspond with geometric features of the annular space 236 such that the noise attenuation device is installed in a snap-in, clip, groove, or other suitable feature for holding the device in place. Thus, the noise attenuation device 240 may be easily fitted to a wide-range of vehicles comprising different FLVV shapes. In this way, the noise attenuation device 240 may be removed and/or replaced without disassembling the FLVV. This not only provides convenience, but also provides a reliable method for determining degradation of the noise attenuation device. For example, if a portion of the noise attenuation device 240 degrades (e.g., breaks) due to contact with the float 220, then the broken portion may fall into the fuel tank without impeding a function of the FLVV 200. In some examples, the noise attenuation device may be located between the float 220 and the lower portion 230, coupled to a bottom of the float 220.

Loops 242 may be shaped based on a size of the FLVV, a size and/or shape of the float, a size of the fuel tank, etc. The loops 242 may be helical, planar, and/or torsional in some examples. In the current embodiment, the loops 242 are curved such that the loops initially bend in the downward direction before curving upward. The loops 242 may be closer to a base of the fuel tank compared to the FLVV 200.

Extreme ends (tips) 244 may be located directly beneath the bore of the lower portion 230. Additionally or alternatively, the loops may curve downward before bending in a perpendicular direction toward the central axis 294, where extreme ends may point in similar radial directions directly below the bore of the lower portion. Other embodiments may include the loops curving downward before curving upward with extreme ends of the loops pointing in radial directions. The loops 242, along with the tips 244 may be U-shaped, C-shaped, O-shaped, Q-shaped, number three-shaped, etc. It will be appreciated by someone skilled in the art that the loops may be a variety of suitable shapes for stopping motion of a float. The noise attenuation device 240 is symmetric in one example. In another example, the noise attenuation device 240 is asymmetric where each loop of the loops 242 may be a different shape and/or lengths.

FIG. 3 shows a cross-sectional view 300 of an assembled FLVV 200 of FIG. 2. As such, components previously introduced are number similarly in subsequent figures. The FLVV 200 comprises three components namely, an upper portion 210, a float 220, and a lower portion 230. In the cross-sectional view 300, the upper 210 and lower 230 portions are connected to each other through a locking mechanism to form a continuous system. The FLVV 200 encloses an annular passage 302 throughout its length through which fluid and/or vapor may pass. An axes system 290 is shown comprising of two axes, an x-axis axis (e.g., horizontal axis) parallel to a horizontal direction and a y-axis (e.g., vertical axis) parallel to a vertical direction relative to a direction of gravity (arrow 298). A central axis 292 of the valve side port 212 is perpendicular to a central axis 294 of the FLVV 200.

The float 220 may be actuated along the annular passage 302, where its actuation is guided by a plurality of vanes 304 such that radial motion of the float is decreased. Vanes 304 of the upper portion 210 may guide an axial (vertical) movement of the float 220 while mitigating radial movement of the float 220 due to a proximity of the vanes to the float. This may reduce noise generated by the float 220 contacting interior surfaces of the upper portion 210 due to movement in radial directions. Furthermore, the interior features may maintain an alignment of the float 220 along the central axis 294 of the FLVV 200. In other words, the float 220 may slide in a vertical direction, parallel to the central axis 294, with guidance from internal features of the upper portion 210 in response to buoyant forces generated in the fuel tank. The vanes 304 are substantially equidistantly spaced apart from each other. This allows liquid fuel and/or fuel vapor to flow between each of the vanes 304 to inlets of the lower portion 230 when the float 220 is in a lower position. Substantially equidistant may be defined as a space between two vanes of the vanes 304 deviating from a different space between two different vanes of the vanes 304 by a tolerance of 1-5%. In one example, there are exactly 16 of the vanes 304 equidistantly spaced apart along a circumference of the annular channel 302.

The float 220 is slideably disposed inside the FLVV 200, where the float 220 may actuate in a vertical direction along the central axis 294 of the FLVV 200 to an upper position and a lower position. The lower position may be defined as a position where a weight of the float 220 overcomes a buoyant force of the fuel tank where the protuberance of the float 220 extends through the bore of the annular seating surface 232 of the lower portion 230. The float 220 fluidly coupled the fuel tank to the fuel line and the vapor system where fuel may enter the fuel tank and fuel vapor may exit the fuel tank. Thus, the fuel tank is not "full" of liquid fuel.

Full may be defined as the fuel tank comprising a threshold volume of liquid fuel based on a difference between an entire volume of the fuel tank and a volume of a desired headspace of fuel vapor. The spring 226 is fully compressed inside an annular indentation 308 in the lower position, absorbing and storing a kinetic energy generated from the downward sliding of the float. Alternatively, the upper position may be defined as a position where buoyant forces of the fuel tank push the float 220 to be pressed against a top wall of an interior space in the upper portion 210. The float 220 hermetically seals the fuel tank from such that substantially no vapor exits the fuel tank under select conditions via mechanical movement of the float via spring, pressure, and gravitational forces. This allows the fuel tank to maintain a desired headspace of fuel vapor. The spring 226 provides assistance to the float 220 when the float moves from the lower position (e.g., open position) to the upper position (e.g., closed/shut-off position) and as a result, the spring becomes fully extended in the upper position.

The float is in a lower position, as shown, due to a fuel level in a fuel tank not being full such that hydraulic forces in the fuel tank are unable to actuate the float to the upper position. As described above, the lower position allows fuel vapor to exit the fuel tank. Conversely, the upper position inhibits fuel vapor from flowing out of the fuel tank. The float 220 overcomes a hydraulic force in the fuel tank such that the float moves downward along the annular passage 302, compressing the spring 226. If the fuel level in the fuel tank increases, then hydraulic forces in the fuel tank may actuate the float 220 to the upper position with assistance from the spring 226. In this way, the spring 226 may store kinetic energy during movement of the float 220 to the lower position and release the stored kinetic energy during movement of the float to the upper position.

The float 220 is pressed against the noise attenuation device 240. Specifically, a portion of the protuberance 222 extending through the opening 236 of the lower portion 230 contacts loops 242 located below the lower portion 230 outside of the annular passage 302. The protuberance 222 contacts the loops 242 prior to an outer wall 224 contacting an annular seating surface 232. In this way, the loops 242 slow and/or stop a motion of the float 220 before the outer wall 224 contacts the lower portion 230. The noise attenuation device 240 is flexible (elastic) while being simultaneously rigid. The flexibility of the noise attenuation device 240 allows it to bend in a downward direction as it receives the float 220 and provides a soft landing surface. The rigidity of the noise attenuation device 240 allows it to assist the float 220 in its upward movement back to the lower position. Thus, the lower position may also be referred to as a rest position, where the float 220 is in a force equilibrium. The force equilibrium may include an upward force of the spring 226 combined with the buoyant force being substantially equal to downward force of the float 220 combined with the force of gravity. The float 220 actuates slightly below the lower position (e.g., rest position) and presses the noise attenuation device in a downward direction. The noise attenuation device 240 absorbs a portion of kinetic energy from the float 220 and uses the kinetic energy to flex in the upward direction to urge the float back to the lower position. In some examples, additionally or alternatively, the noise attenuation device 240 may not move along the y-axis upon receiving and/or moving the float 220 and as a result, the lower position may be a lowermost position.

In the absence of the noise attenuation device 240, the outer wall 224, concentric with the protuberance 222, contacts an annular seating surface 232 with a contact force greater than a threshold force and generates an audible noise able to permeate to an interior of the vehicle. The threshold force may be based on a contact force capable of generating a noise audible to a passenger of the vehicle. The noise attenuation device 240 decreases the contact force of the float below the threshold force such that when the float contacts the annular seating surface a noise generated is not audible to a passenger of the vehicle. In this way, unlike the spring, the noise attenuation device 240 may absorb a portion of kinetic energy from the float, thereby decreasing an amount of energy able to be converted into noise energy, and apply the portion of kinetic energy back to the float in an upward direction. Thus, the noise attenuation device 240 may lift the float 220. In some examples, the outer wall 224 may touch the annular seating surface 232 in the lower position when the protuberance is in contact with the loops 242. In other examples, the outer wall 224 may be spaced away from the annular seating surface 232 such that an annular gap is located between the outer walls and the annular seating surface when the protuberance 222 is in contact with the loops 242.

FIG. 4 shows a bottom-up view 400 of an assembled FLVV 200. The FLVV 200 comprises three components namely, an upper portion 210, a float 220, and a lower portion 230. In the bottom up view, the lower portion 230 is coupled to the upper portion 210 with the float 220 being slideably disposed therebetween. An axes system 290 is shown comprising of two axes, an x-axis axis (e.g., horizontal axis) parallel to a horizontal direction and a y-axis (e.g., vertical axis) parallel to a vertical direction relative to a direction of gravity (arrow 298). The valve is show in FIG. 2 for the situation where it is installed in a fuel tank of a vehicle on level ground.

One of the nozzles 402 may be used similarly to nozzle 212 of the embodiment of FIG. 2. The float 220 is shown in the lower position, where the nozzles 402 may fluidly communicate with the fuel tank via the annular passage of the FLVV and inlet 404 of the lower portion 230. As shown, the inlets 404 are substantially identical and as equidistantly spaced around the bore 238. Substantially identical may be defined as deviations between inlets due to manufacturing practices being equal to 1-5%. As shown, the protuberance 222 protrudes through the bore 238 and contacts the noise attenuation device 240. In one example, the protuberance 222 may contact multiple points along loops 242 of the noise attenuation device. This allows the noise attenuation device to further decrease a contact force between an outer wall of the float and an annular seating surface of the lower portion 230 compared to only one contact point.

The noise attenuation device 240 comprises a circumference corresponding to a circumference of the annular opening 236 such that the device is pressed against a surface of the lower portion adjacent the annular opening. As described above, the noise attenuation device 240 is single, contiguous component, uninterruptedly coupled to the lower portion 230. The noise attenuation device 240 is shaped based on a shape of one or more of the lower portion 230, the float 220, and the FLVV 200. In the embodiment of FIG. 4, the noise attenuation device 240 is partially circular before curling into loops 242. The noise attenuation device 240 is substantially C-shaped with ends of the C-shape forming loops, where the loops 242 may extend in downward and/or radially outward. The loops extend from an outer circumference of the noise attenuation device 240 to a center of the FLVV before curling radially outward, where tips 244 point toward a body of the noise attenuation device. As an example, the loops may initially curl toward each other where tips of the loops point in radially opposite directions. In another example, the loops may curl downward toward a fuel tank with tips pointing toward the bore 238. As described above, one loop of the loops 242 may be different than a different loop of the loops 242.

Thus, a noise attenuation device may be adjustable, where the device is shaped to be located outside of an annular passage of a fluid tank valve below a lower portion (base) of the valve. A float of the valve may contact the device at a plurality of contact points to decrease a potential for kinetic energy of the float to be converted into sound energy following a collision between the float and the base. The noise attenuation device contacts the float prior to the float colliding with the base, where the noise attenuation device absorbs and stores a portion of kinetic energy from the float. This decreases an amount of kinetic energy able to be converted into sound energy, which may ultimately decrease noise generated due to actuation of the float.

FIG. 5A shows an isometric view 500 of the noise attenuation device 240. The noise attenuation device 240 is shown removed from a lower portion of a FLVV. Arrow 501 depicts a downward direction which is parallel to a direction of gravity for a noise attenuation device installed in a FLVV for a vehicle with all its wheels sitting on the ground. As described above, the noise attenuation device is a single, contiguous noise attenuating device. The noise attenuation device is adjustable and may be used in other valves with moving components to decrease a noise emitted from the valve.

The noise attenuation device 240 comprises a body 502 with a C-shape (partially circular shape. In one example, the body 502 of the noise attenuation device 240 is only partially circular. The body 502 may be a horseshoe shape, U-shape, semi-circular shape, elliptical shape, etc. in other embodiments. The body 502 may act as an outer retention feature, which is pressed against an interior surface of a lower portion (base) of the FLVV. The noise attenuation device 240 comprises an opening 503 about a central axis 590. Bends 504 direct the noise attenuation device in a direction both downward and oblique to the body 502. Loops 242 extend from the bends 504 and are parallel to a plane of the body 502. In this way, the bends 504 may be the only portion of the noise attenuation device 240 extending in the downward direction. The opening 503, bends 504, and loops 242 may be adjusted based on a shape of an FLVV.

Loops 242 originate from a narrowest portion of the opening 503 and extend in a direction parallel to one another. The loops 242 turn radially outward opposite one another, where the loops become substantially J-shaped. In other words, between lines 595 and ends 244, the loops 242 begin to turn radially parallel to one another such that the ends 244 point in radially similar direction. The ends 244 point toward an origination of the opening 503 as shown. In one example, a radius of the noise attenuation device 240 incrementally increases from the ends 244 to a portion of the body located along the central axis 590. A portion of the noise attenuation device 240 on a first side of the central axis 590 is substantially identical to a remaining portion of the noise attenuation device 240 on a second side of the central axis. In this way, the noise attenuation device is symmetric about the central axis 590. Substantially identical may be defined as tolerances due to a manufacturing process of the noise attenuation device deviating from one another between 1-5%.

Dashed circle 506 indicates a region of the noise attenuation device 240 which may come into contact with a float of the FLVV. In some embodiments, additionally or alternatively, the noise attenuation device 240 may further contact the ends 244 to distribute an impact point when the float contacts the noise attenuation device. In this way, the noise attenuation device may comprise a plurality of contact points for slowing a downward motion of the float such that a decreased amount of kinetic energy may be converted into sound energy during an impact between the float and an annular seating surface.

FIG. 5B shows a side-on view 550 of the noise attenuation device 240. The noise attenuation device 240 is shown removed from a lower portion of a FLVV. Arrow 501 depicts a downward direction. As described above, the noise attenuation device is a single, contiguous noise attenuating device. As shown in the side-on view 550, one loop of the loops 242 occludes a second loop of the loops 242 due to the symmetry of the noise attenuation device. One tip of the tips 244 is shown via a dashed line behind the one loops of the loops 242. The noise attenuation device is adjustable and may be used in other valves with moving components to decrease a noise emitted from the valve.

As shown, the body 502 is vertically higher than the loops 242 and the tips 244 (shown by a dashed line) due to the bends 504. The bends 504 extend in a direction oblique to a plane A of the body 502 in downward and radial directions. As described above, the bends 504 originate adjacent the opening 503. Therefore, the bends 504 point radially away from the opening 503. The bends generate an angle $\Theta$ which may be an angle between 30-75°. The loops 242 extend from the bends 504 in a direction parallel to the body 502 such that the plane A of the body 502 is parallel to a plane B of the loops 242. Thus, plane A may also be described as an upper plane and plane B may be described as a lower plane, where the upper plane is higher than the lower plane.

Dashed circle 506 indicates a region of the noise attenuation device 240 which may come into contact with a float of the FLVV, as described above. The loops 242 may bend angularly downward when the float of the FLVV contacts the loops. Thus, the loops 242 may no longer be parallel with the plane A or align with the plane B. The loops 242 may align with the plane B after actuating the float in an upward direction. As described above, the noise attenuation device is elastic and absorbs kinetic energy from movement of the float, which allows the noise attenuation device to both decrease noise generated by the float and to move the float in the upward direction via the stored energy. This allows the loops 242 to realign with the plane B.

In this way, an easy-to-install noise attenuation device may be added to an existing FLVV of a vehicle to decrease sounds emanating from a vehicle fuel tank. The noise attenuation device decreases a noise generated when a float of the FLVV contacts an annular seating surface of a lower portion of the FLVV. The noise may be decreased by the noise attenuation device absorbing a portion of kinetic energy from the FLVV, thereby decreasing an amount of kinetic energy that may be converted into sound energy. Furthermore, the noise attenuation device pushes against a motion of the float via the absorbed kinetic energy to further decrease sound energy created.

A first embodiment of a noise attenuation device comprising a contiguous flexible wire fitted outside of an annular passage of a valve, where the flexible wire is configured to engage with a protuberance of a float of the valve when the float is in a lower position, and where the flexible wire decreases a contact force between the float and a base of the valve. A first example of the noise attenuating device further comprises the flexible wire comprises a plurality of contact points for receiving the protuberance. A second example of the noise attenuating device optionally including the first example further comprises an opening, where the opening narrows in a direction toward a center of the noise attenuation device. A third example of the noise attenuating further including one or more of the first and second examples includes where the flexible wire comprises a C-shaped body with loops located below the body and in a plane parallel to a plane of the body. A fourth example of the noise attenuating device optionally including the first through third examples includes where the float is in contact with the flexible wire and an annular seating member of the base when the float is in the lower position. A fifth example of the noise attenuation device optionally includes the first through fourth examples includes where the flexible wire absorbs a portion of kinetic energy from the float such that the flexible wire pushes the float in a direction opposite its movement.

A first embodiment of a fluid tank comprising a float axially displaceable in a valve, where the float sealingly engages an outlet of the valve in an upper position, and where the float contacts a lower portion of the valve in a lower position wherein a protuberance of the float extends through an opening of the lower portion and engages with a noise attenuation device outside an annular passage of the valve. A first example of the fluid tank optionally includes where the fluid tank comprises fuel. A second example of the fluid tank optionally including the first example further includes where the float of the valve is actuated responsive to a buoyant force of the fluid tank. A third example of the fluid tank comprising one or more of the first and second examples further includes where the float contacts loops of the noise attenuation device when in the lower position. A fourth example of the fluid tank comprising one or more of the first through third examples further includes where the noise attenuation device is flexible and decreases a velocity of the float prior to urging the float to the upper position. A fifth example of the fluid tank comprising one or more of the first through fourth examples further includes where the noise attenuation device is closer to a bottom of the fluid tank compared to the valve. A sixth example of the fluid tank comprising one or more of the first through fifth example further includes where the noise attenuation device is a single-body, contiguous device. A seventh example of the fluid tank comprising one or more of the first through sixth examples further includes where the noise attenuation device is located below the lower portion of the valve. A eighth example of the fluid tank comprising one or more of the first through seventh examples further includes where the noise attenuation device comprises an opening and a bend, which are adjusted based on a size of the valve. A ninth example of the fluid tank comprising one or more of the first through eighth examples further includes where the noise attenuation device comprises a circumference correspondingly smaller than a circumference of the lower portion such that the noise attenuation device is pressed against interior surfaces of the lower portion. A tenth example of the fluid tank comprising one or more of the first through ninth examples further includes where the valve is physically coupled to an upper wall of the fluid tank.

A noise attenuation device for a fill limit vent valve comprising a partially circular body aligned with an upper plane contiguous, the body also having elastic loops aligned with a lower plane via bends oblique to the upper and lower planes, where the upper plane is vertically higher than the lower plane when installed in the valve. A first example of the noise attenuation device further includes where the noise attenuation device is symmetric about a central axis. A second example of the noise attenuation device optionally including the first example further includes where the bends originate at an opening of the partially circular body, and where the opening narrows through the bends and expands adjacent the loops. A third example of the noise attenuation device optionally includes the first and/or second examples further includes where the loops originate from the bends and turn away from one another in radially opposite directions. A fourth example of the noise attenuation device optionally includes one or more of the first through third examples further includes where the loops comprise extreme ends facing radially parallel directions. A fifth example of the noise attenuation device optionally includes one or more of the first through fourth examples further includes where the loops bend outside of the lower plane in response to a float of the valve contacting the loops in a lower position.

A valve for a fluid tank, comprising a tubular upper body configured to allow the passage of fluid through an annular passage located therein, the upper body further comprising guiding vanes substantially equally spaced apart from each other, a float elastically supported by a spring and configured to move along an axial axis responsive to a buoyant force of the fluid tank, a base forming a bottom of the upper body, where the base is engaged with the spring and contacts the float when the float is in a lower position, and a wire loop spring engaged with an annular opening of the base outside of the annular passage and below the base, and where the spring elastically supports the float in the lower position to decrease a contact force between the float and the lower position while also being able to lift the float. A first example for the valve for the fluid tank optionally includes where the noise attenuation device is pressed against walls of the annular opening. A second example of the valve for the fluid tank optionally includes the first example further includes where the noise attenuation device is adjustable.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fluid tank comprising:
    a float axially displaceable in a valve, where the float sealingly engages an outlet of the valve in an upper position, and where the float contacts a lower stop of the valve in a lower position;
    wherein a protuberance of the float extends through an opening of the lower stop and a bottommost surface of the protuberance abuts outer surfaces of a symmetric wire spring outside an annular passage of the valve, the wire spring being symmetric about a plane that extends vertically through a center of the float, and where the protuberance contacts the wire spring before contacting the lower stop, the wire spring shaped to be arranged below the lower stop.

2. The fluid tank of claim 1, wherein the fluid tank is a fuel tank.

3. The fluid tank of claim 1, wherein the float of the valve is actuated responsive to a buoyant force of a fluid of the fluid tank.

4. The fluid tank of claim 1, wherein the float contacts loops of the wire spring when in the lower position.

5. The fluid tank of claim 1, wherein the wire spring is flexible and decreases an energy transfer from the float to the lower stop during impact.

6. The fluid tank of claim 1, wherein the wire spring is closer to a bottom of the fluid tank compared to the valve.

7. The fluid tank of claim 1, wherein the wire spring is a single-body, contiguous device.

8. The fluid tank of claim 1, wherein the wire spring comprises an opening and a bend, which are adjusted based on a size of the valve.

9. The fluid tank of claim 1, wherein the wire spring comprises a circumference correspondingly smaller than a circumference of the lower stop such that the wire spring is pressed against interior surfaces of the lower stop.

10. The fluid tank of claim 1, wherein the valve is physically coupled to an upper wall of the fluid tank.

11. A noise attenuation device for a fill limit vent valve comprising:
    a partially circular wire spring body aligned with an upper plane, the wire spring body being contiguous and also having elastic loops aligned with a lower plane via bends oblique to the upper and lower planes, where the upper plane is vertically higher than the lower plane when installed in the fill limit vent valve, where the wire spring body is symmetric about a plane that extends vertically through a center of a float of the fill limit vent valve, and where a protuberance of the float extends through an opening of a lower stop, and a bottommost surface of the protuberance abuts the elastic loops of the wire spring body before the float contacts the lower stop of the fill limit vent valve, the wire spring body shaped to be arranged below the lower stop.

12. The noise attenuation device of claim 11, wherein the wire spring body is symmetric about a central axis.

13. The noise attenuation device of claim 11, wherein the bends originate at an opening of the wire spring body, and where the opening narrows through the bends and expands adjacent the elastic loops.

14. The noise attenuation device of claim 11, wherein the elastic loops originate from the bends and turn away from one another in radially opposite directions.

15. The noise attenuation device of claim 11, wherein the elastic loops comprise extreme ends facing radially parallel directions.

16. The noise attenuation device of claim 11, wherein the loops bend outside of the lower plane in response to the float of the fill limit vent valve contacting the elastic loops in a lower position.

17. A valve for a fluid tank, comprising:
    a tubular upper body configured to allow passage of vapor through an annular passage located therein, the upper body further comprising guiding vanes substantially equally spaced apart from each other;
    a float elastically supported by a spring and configured to move along an axial axis responsive to a buoyant force of a fluid of the fluid tank;
    a lower stop forming a bottom of the upper body, where the lower stop is engaged with the spring and contacts the float when the float is in a lower position; and
    a wire loop spring engaged with an annular opening of the lower stop outside of the annular passage and below the lower stop, and where the wire loop spring elastically supports the float in the lower position to decrease a contact force between the float and the lower position while also being able to lift the float, where the wire loop spring is symmetric about a plane that extends vertically through a center of the float, and where a protuberance of the float extends through an opening of the lower stop and a bottommost surface of the protuberance abuts outer surfaces of the wire loop spring before the float contacts the lower stop.

18. The valve for the fluid tank of claim 17, wherein the wire loop spring is pressed against walls of the annular opening.

19. The valve for the fluid tank of claim 17, wherein the wire loop spring is adjustable.

* * * * *